United States Patent
Werle (10) Patent No.: US 12,143,907 B2
(45) Date of Patent: Nov. 12, 2024

(54) METHOD FOR EXCHANGING DATA BETWEEN A TRAILER AND A ROAD USER, TRAILER COMMUNICATION MODULE AND TRAILER

(71) Applicant: ZF CV Systems Global GmbH, Bern (CH)

(72) Inventor: Tobias Werle, Hannover (DE)

(73) Assignee: ZF CV Systems Global GmbH, Bern (CH)

( * ) Notice: Subject to any disclaimer, the term of this patent is extended or adjusted under 35 U.S.C. 154(b) by 118 days.

(21) Appl. No.: 17/865,211

(22) Filed: Jul. 14, 2022

(65) Prior Publication Data
US 2022/0353655 A1    Nov. 3, 2022

Related U.S. Application Data

(63) Continuation of application No. PCT/EP2020/052122, filed on Jan. 29, 2020.

(51) Int. Cl.
*H04W 4/40* (2018.01)
*B60W 50/02* (2012.01)
(Continued)

(52) U.S. Cl.
CPC .......... *H04W 4/40* (2018.02); *B60W 50/0205* (2013.01); *B60W 50/0225* (2013.01);
(Continued)

(58) Field of Classification Search
CPC ... H04W 4/40; H04W 76/14; B60W 50/0205; B60W 50/0225; B60W 60/00;
(Continued)

(56) References Cited

U.S. PATENT DOCUMENTS 10,126,755 B1   11/2018 Lavi et al.
11,184,734 B1 *  11/2021 Carraway ............... H04W 4/90
(Continued)

FOREIGN PATENT DOCUMENTS

CN   109564721 A   4/2019
CN    11406519 A  11/2019
(Continued)

OTHER PUBLICATIONS

Translation of the Written Opinion of the International Searching Authority dated Apr. 3, 2020 for international application PCT/EP2020/052122 on which this application is based.
(Continued)

*Primary Examiner* — Omar Casillashernandez
(74) *Attorney, Agent, or Firm* — Walter Ottesen, P.A.

(57) ABSTRACT

A method for transmitting data between a trailer and a road user in a vehicle environment is provided, wherein the data are transmitted according to a V2X standard with low latency via a wireless V2X data connection between a trailer communication module of the trailer and a subscriber communication module of the road user. The wireless data connection is between the trailer communication module and the subscriber communication module, or indirectly via a distribution station. The distribution station forwards the transmitted data directly, wherein the trailer communication module autonomously selects and activates an operating mode depending on the respective road user. As a function of the activated operating mode, trailer data relating to the trailer are selected and autonomously transmitted according to the V2X standard via the wireless V2X data connection and/or subscriber data provided by road users are received and autonomously processed.

27 Claims, 3 Drawing Sheets

(51) Int. Cl.
  *B60W 60/00* (2020.01)
  *H04W 76/14* (2018.01)

(52) U.S. Cl.
  CPC ............ *B60W 60/00* (2020.02); *H04W 76/14* (2018.02); *B60W 2300/14* (2013.01); *B60W 2520/28* (2013.01); *B60W 2554/404* (2020.02); *B60W 2556/65* (2020.02)

(58) Field of Classification Search
  CPC ......... B60W 2300/14; B60W 2520/28; B60W 2554/404; B60W 2556/65
  USPC ........................................................ 340/431
  See application file for complete search history.

(56) References Cited

U.S. PATENT DOCUMENTS

| | | | |
|---|---|---|---|
| 2013/0006886 A1* | 1/2013 | Estes | F17C 6/00 705/332 |
| 2017/0217368 A1 | 8/2017 | Lewis et al. | |
| 2017/0225667 A1 | 8/2017 | Risse et al. | |
| 2018/0082591 A1 | 3/2018 | Pandy | |
| 2019/0084534 A1 | 3/2019 | Kasper et al. | |
| 2019/0110176 A1 | 4/2019 | Hoellerbauer et al. | |
| 2019/0152282 A1 | 5/2019 | Spengler et al. | |
| 2021/0178986 A1* | 6/2021 | Falb | B60R 11/0229 |

FOREIGN PATENT DOCUMENTS

| | | |
|---|---|---|
| DE | 10 2015 011 320 A1 | 3/2016 |
| DE | 10 2014 015 132 A1 | 4/2016 |
| DE | 10 2017 201 717 A1 | 8/2017 |
| DE | 102017220585 A1 * | 10/2017 |
| DE | 11 2016 006 505 T5 | 12/2018 |
| DE | 10 2018 117 526 A1 | 1/2019 |
| DE | 10 2017 216 352 A1 | 3/2019 |

OTHER PUBLICATIONS

International Search Report of the European Patent Office dated Apr. 3, 2020 for international application PCT/EP2020/052122 on which this application is based.
English translation of the First Office Action of the Chinese Patent Office dated Sep. 9, 2024 in corresponding Chinese patent application 202080093652.8.

* cited by examiner

METHOD FOR EXCHANGING DATA BETWEEN A TRAILER AND A ROAD USER, TRAILER COMMUNICATION MODULE AND TRAILER

CROSS REFERENCE TO RELATED APPLICATION

This application is a continuation application of international patent application PCT/EP20201052122, filed Jan. 29, 2020 designating the United States, and the entire content of the above application is incorporated herein by reference.

TECHNICAL FIELD

The present disclosure relates to a method for exchanging data between a trailer and a road user in a vehicle environment, a trailer communication module, and a trailer.

BACKGROUND

For the coordination of vehicles in a platoon (convoy, vehicle network), communication modules are known via which a wireless V2X data connection can be established that enables an exchange of data between vehicles or infrastructure facilities according to the V2X standard. In most cases, these communication modules are configured so that one such communication module is installed for each entire vehicle, including a towing vehicle and possibly a trailer. If several communication modules are installed within an entire vehicle, this may result in inconsistent data. Thus, the exchanged data possibly become unusable because they contain contradictions.

US 2017/0217368 further describes a towing vehicle communication module that enables data exchange according to the V2X standard, via a wireless V2X data connection between two (towing) vehicles. This is used to obtain additional information from the following vehicle when the towing vehicle is towing a large trailer that blocks the view of the following vehicle through the mirrors. The trailer itself does not have a communication module.

DE 10 2015 011 320 A1 describes a data exchange according to the V2X standard, via a wireless V2X data connection between a bus and an approaching vehicle, in order to enable safe driving out of a bus stop.

US 2017/0225667 describes the integration of a telematics module into an electronic braking system (EBS). US 2019/0110176 describes how a trailer behind the towing vehicle causes a dead zone for wireless data communication according to the V2X standard. To counter this, a trailer communication module is arranged in the trailer and a subscriber communication module is arranged in the towing vehicle, which are able to communicate directly with one another via a first communication protocol. Furthermore, the trailer communication module can communicate with other road users in the vehicle environment via a second communication protocol that is different from the first communication module. The choice of the first communication protocol is thus dependent on the choice of the second communication protocol, so that the operation of the trailer communication module is always dependent on the wireless connection to the towing vehicle. The trailer communication module therefore does not establish the V2X data connection autonomously.

U.S. Pat. No. 10,126,755 further describes a trailer with a trailer communication module that can communicate with road users via a wireless ecosystem of radio-frequency devices. In this case, environment information data are transmitted in order to make it easier to approach the trailer and to maneuver with it. The trailer communication module does not function autonomously here and does not communicate with the road users via a standardized V2X connection.

SUMMARY

An object of the present disclosure is to provide a method for exchanging data between a trailer and a road user, a trailer communication module, and a trailer, which enable autonomous and standardized operation of the trailer.

According to the present disclosure, a method is provided for transmitting data between a trailer and a road user, for example a towing vehicle and/or an additional trailer or an infrastructure facility or a third-party vehicle, in a vehicle environment, wherein the data are transmitted according to a V2X standard with low latency, that is, with a latency of less than 200 ms, preferably less than 100 ms, in particular less than 50 ms, via a wireless V2X data connection between a trailer communication module of the trailer and a subscriber communication module of the road user, wherein the wireless data connection is established directly between the trailer communication module and the respective subscriber communication module, or indirectly via a distribution station, for example a radio mast, wherein the distribution station forwards the transmitted data directly, that is, without any modification of the data, wherein the trailer communication module autonomously selects and activates an operating mode depending on the respective road user, wherein, as a function of the activated operating mode, trailer data relating to the trailer are selected and autonomously transmitted according to the V2X standard via the V2X wireless data connection, and/or subscriber data provided by road users and relating to the road users are received and autonomously processed according to the V2X standard.

This enables a low-latency, flexible provision of information, via the wireless V2X data connection, about a trailer and/or its cargo that is more independent of the communication infrastructure, via an autonomous, intelligent trailer communication module. Accordingly, the information can be transmitted directly and without being requested between the trailer and the road users. This means that the data are transmitted via the wireless V2X data connection without any intermediate request, for example in the distribution station or from the respective road user. Instead, the trailer communication module alone decides which data are selected and transmitted, possibly depending on the road user. Furthermore, it may also be provided that the trailer communication module autonomously re-outputs the subscriber data received from road users and relating to the road users via the wireless V2X data connection. The trailer communication module can accordingly also autonomously forward processed or unprocessed data.

Moreover, due to its autonomy, the trailer communication module is not dependent on the infrastructure of other road users, especially a towing vehicle. The information can therefore be broadcast more easily, thereby increasing road safety without putting the data of the towing vehicle into an inconsistent state, since the trailer communication module can select the data intelligently and autonomously, in particular as a function of the road user (potentially) receiving the trailer data. The trailer data can also be selected and output directly from the location of the event without being requested, so that no cloud or intermediate server is required to manage the trailer data and provide the data only on demand or upon request.

In addition, the output and distribution of information are carried out independently of external software which for example is installed on a server of the respective road user connected to the respective subscriber communication module. Thus, information is not provided via an access or a query or a request to the server to which the data were previously transmitted. Instead, this is done without being requested and with low latency directly via the V2X data connection.

In addition, messages can be exchanged with low latency between a trailer and a towing vehicle or another road user, since a standardized V2X connection is used. The low latency is furthermore used for traffic safety, as a message received from a vehicle driving ahead that contains a deceleration request having a high deceleration value may result in a direct response from the trailer. If the trailer receives this message, it can already apply brake pressure in order to be able to react more quickly to imminent braking.

Furthermore, a wide range of information can be transmitted via the V2X standard, wherein the transmitted information may also be customized or extended. This individuality promotes the traceability of trailers and their goods, as well as road safety. Since the V2X standard is used, there is also a high level of availability, as this V2X standard is used by a large number of vehicles and road users.

Preferably, it can be provided that a direct data connection that is established directly between the trailer and one of the road users, wherein the direct data connection is a short-range DSRC data connection or a 5G direct connection, and/or a 5G mobile connection that is established indirectly between the trailer and one of the road users via a distribution station, is used as a wireless V2X data connection. The direct data connection is preferably in a frequency band between 5.850 and 5.925 GHz and has a connection range of up to 1000 m.

Accordingly, wireless connections may be used, which for example are already used in the field of platooning, so that the infrastructure (communication module) is already available in a large number of vehicles. Accordingly, only the intelligence or the software algorithms of the respective communication modules have to be expanded, and the trailer as a sub-vehicle also has to be equipped with such a communication module.

Preferably, it can further be provided that the trailer data and the subscriber data are transmitted via wireless data transmission, according to the V2X standard, in respectively associated V2X data packets. Accordingly, basic data, for example a global position, an actual speed, a direction of travel, an actual acceleration, et cetera, can be transmitted in a V2X primary data packet, and further freely selectable information can be transmitted in a V2X secondary data packet, for example a target acceleration, load information, as well as environment signals from an environment detection system, or the like. As a result, standardized communication can be used, which may also be adjusted, making data transmission flexible, especially from the trailer.

Preferably, it can further be provided that the trailer communication module is operated in a coupling mode and/or in an interface mode if the trailer communication module plausibly determines that the trailer is coupled to at least one towing vehicle associated with the trailer and/or at least one additional trailer associated with the trailer. In this way, data can be intelligently distributed over the entire train with low latency, for example in a "Roadtrain," "Megaliner," "EuroCombi." In each of the (additional) trailers, a trailer communication module according to the present disclosure may be provided which, using its own intelligence, can autonomously select and transmit data, and receive, evaluate, and forward data from other road users, so that it is possible to respond to warnings at an early stage, for example before a brake request from the towing vehicle has been passed through to the last trailer.

Alternatively, the trailer communication module may be operated in a free mode if the trailer communication module plausibly determines that the trailer is not coupled to any towing vehicle and/or any additional trailer, and/or cannot plausibly determine whether the trailer is coupled to a towing vehicle and/or to no additional trailer. The trailer communication module thus autonomously selects and activates an operating mode, whereupon appropriately selected data are transmitted via the wireless V2X data connection. This is mainly for road safety, as other road users should be warned and informed of possible hazards, regardless of whether they are hitched to a towing vehicle or an additional trailer. This wireless data communication would be publicly accessible in free mode, that is, it is preferably unencrypted, as it should be understood by as many road users as possible.

Preferably, it can be provided that the trailer communication module activates the coupling mode and/or the interface mode if, based on the towing vehicle data output by the towing vehicle via the wireless V2X data connection, for example based on a global towing vehicle position, and/or based on the additional-trailer data output by the additional trailer via the wireless V2X data connection and/or based on a coupling message, it is plausibly determined that the trailer is coupled to the at least one towing vehicle and/or to the at least one additional trailer. This determination or plausibility check may for example be carried out over a certain period of time. Such monitoring of the towing vehicle data may be carried out autonomously by the intelligent trailer communication module, so that the effort required to select the operating mode can be kept to a minimum.

Preferably, it can be provided that, in the coupling mode, the trailer communication module autonomously selects and/or adjusts the trailer data and outputs the data to the vehicle environment for reception by other road users, wherein trailer data to be output for this purpose are compared with the towing vehicle data and/or the additional-trailer data, and/or are checked for plausibility, and contradictory trailer data are not transmitted. The trailer communication module may accordingly independently make a targeted selection or adjustment of data that are output via the standardized V2X data connection, without using the data connection of the towing vehicle or adjusting the data of the towing vehicle and/or the additional trailer. Nevertheless, via the adjusted data, an overview of the entire vehicle may be obtained without the occurrence of contradictions or inconsistencies. The trailer communication module may also for example withhold trailer data that do not match or that contradict the towing vehicle data and/or the additional trailer data, or that are less accurate than the data.

Preferably, it can further be provided that, in the interface mode, the trailer data and/or the towing vehicle data and/or the additional-trailer data are exchanged via the wireless V2X data connection between the trailer and the at least one towing vehicle, and/or between the trailer and the at least one additional trailer.

Accordingly, the wireless V2X data connection creates an additional interface between the towing vehicle and the trailer, which is preferably encrypted, since the trailer data and/or towing vehicle data and/or additional-trailer data transmitted via the interface relate only to the vehicle combination or the train, so that data security with respect to data that are also public is to be increased via encryption. Since a wide range of data can be exchanged via the V2X standard, it is advantageous that data is also transmittable that for example cannot be transmitted via a wired standardized CAN interface.

Preferably, it can be provided that, in the interface mode, only those trailer data and/or towing vehicle data and/or additional-trailer data are transmitted via the wireless V2X data connection which cannot be transmitted via a standardized CAN interface between the at least one towing vehicle and the trailer, and/or
the at least one additional trailer and the trailer, for example a towing vehicle target acceleration and/or a towing vehicle target speed. Accordingly, the wireless V2X data connection may be used to transmit additional information which is necessary for safe driving operation. A selection of the data to be taken into account may be made by the trailer communication module by monitoring the data transmitted via the CAN interface and accessing only those towing vehicle data transmitted wirelessly, or outputting only those trailer data wirelessly that are not already transmitted via the CAN interface by cable. This increases the information density without transmitting data twice or redundantly.

According to a further embodiment, it may be provided that the trailer communication module and/or the subscriber communication module determine, in the interface mode, whether the CAN interface between the at least one towing vehicle and the trailer, and/or
the at least one additional trailer and the trailer has failed,
wherein, in the event of a CAN failure of the CAN interface, those trailer data and/or towing vehicle data and/or additional-trailer data that are transmitted via the CAN interface without a CAN failure are also transmitted via the wireless V2X data connection. As a result, the information density compared to a functioning CAN interface may be maintained, since the data that are lost, which are otherwise transmitted via the CAN interface, can instead be transmitted via the wireless V2X data connection.

Preferably, as an alternative or supplemental level of security, it may be provided that, following the activation of the interface mode and/or the coupling mode, the trailer communication module checks whether the subscriber communication module in the towing vehicle and/or in the additional trailer has failed, wherein, in the event of a module failure of the respective subscriber communication module, the trailer communication module outputs a failure warning signal via the wireless V2X data connection and/or selects the output trailer data in such a way that towing vehicle data and/or additional-trailer data lost due to the module failure are replaced.

Advantageously, therefore, in the event of a detection of a module failure in the towing vehicle and/or in one of the additional trailers in the trailer data, in particular the trailer movement information, for example a global trailer position and/or a trailer direction of travel and/or a trailer actual acceleration and/or a trailer target acceleration and/or a trailer actual speed and/or a trailer target speed, may be output from the trailer communication module. This has the advantage that the trailer can inform the other road users via the trailer communication module that there is a module failure and that the trailer data can be used instead. For example, after a module failure, the towing vehicle could initiate a minimum risk maneuver and drive onto the emergency lane. The trailer communication module can detect this and for example output the global trailer position via the wireless V2X data connection, which can be received by other road users.

Preferably, it can further be provided that the trailer communication module is operated in a query mode, wherein the trailer communication module processes query signals in the query mode, wherein the query signals are contained in the received subscriber data from the respective traffic participants, and the trailer communication module selects and transmits trailer data as a function of the query signals. Accordingly, the trailer, without a towing vehicle or with a coupled towing vehicle, may output trailer data in a targeted manner upon request, if the data are available, in order for example to output load information to a depot or other infrastructure facilities or vehicles via the wireless V2X data connection. Due to the autonomy of the trailer communication module, this can be done regardless of whether the trailer is coupled to a towing vehicle or whether the towing vehicle has a subscriber communication module.

Preferably, it may be provided that the trailer communication module determines and transmits trailer data only if the road user transmitting the query signal is trusted. This increases data security, wherein the trailer data may also be transmitted in encrypted form upon request.

Preferably, it can further be provided that trailer movement information and/or trailer additional information determined in the trailer are transmitted in the trailer data, wherein the trailer movement information includes a global trailer position and/or a trailer direction of travel and/or a trailer actual acceleration and/or a trailer target acceleration and/or a trailer actual speed and/or a trailer target speed, and the trailer additional information includes a trailer danger warning and/or a piece of trailer load information and/or a trailer load state and/or trailer environment signals. The trailer data are therefore determined independently of a road user and are accordingly not necessarily generated from transmitted subscriber data. The trailer communication module can therefore basically be operated autonomously only in the trailer without being dependent on another road user. Only when the trailer is in coupling mode or interface mode, can for example information from the towing vehicle or the additional trailer be consulted.

Similarly, it is provided that subscriber movement information and/or subscriber additional information are transmitted in the subscriber data, wherein the subscriber movement information includes a global subscriber position and/or a subscriber direction of travel and/or a subscriber actual acceleration and/or a subscriber target acceleration and/or a subscriber actual velocity and/or a subscriber target velocity, and the subscriber additional information includes a subscriber danger warning and/or a piece of subscriber load information and/or a subscriber load state and/or subscriber environment signals.

The trailer communication module is therefore able to process a wide range of information via the trailer data or subscriber data, and to act and react accordingly autonomously in the vehicle environment.

Preferably, it can further be provided that the movement information is determined by a sensor system, for example a GNSS sensor, in particular a GPS sensor, and/or wheel speed sensors and/or acceleration sensors, which can measure an actual acceleration in an x-direction and/or y-direction and/or z-direction, and/or speed sensors on the trailer and/or on the respective road user, wherein the movement information is transmitted from the sensor system to the trailer communication module via a bus system, for example a CAN bus, or the sensor system is at least partially arranged in the trailer communication module. This enables easy access to the respective movement information, wherein additional sensors do not necessarily have to be installed, as the sensors are possibly already present in the trailer or the respective road user, for example a GNSS sensor.

Preferably, it can further be provided that the load state is detected via a temperature sensor in the cargo space and/or a cargo space camera in the cargo space of the trailer or the road user. As a result, a piece of information about the state of the load can be read in and transmitted in a simple manner.

Preferably, it can further be provided that the trailer communication module in the trailer is supplied with energy independently of the road users. Accordingly, for example a separate energy supply or energy source for the trailer communication module may be provided, which is at least independent of the towing vehicle and for example also independent of other components in the trailer. As a result, the trailer communication module is able to act completely autonomously.

It can preferably further be provided that the trailer data and/or subscriber data are transmitted encrypted via the wireless V2X data connection. As a result, data security may be further increased. This is particularly advantageous in the interface mode, since the data transmission in this case should take place only between the towing vehicle and the trailer or the additional trailer.

It can preferably further be provided that the trailer communication module transmits the trailer data only when a road user with a subscriber communication module is within connection range of the trailer communication module. Accordingly, trailer data is not transmitted constantly, whereby processing effort and energy may be saved. In addition, data security is increased.

Furthermore, according to the present disclosure, a trailer communication module for carrying out the method according to the present disclosure and a trailer with a trailer communication module are provided, wherein the trailer communication module is autonomous or is a component of an electronic trailer braking system. Therefore, this can be easily retrofitted.

BRIEF DESCRIPTION OF THE DRAWINGS

The invention will now be described with reference to the drawings wherein.

DESCRIPTION OF THE PREFERRED EMBODIMENTS

Figure 1:
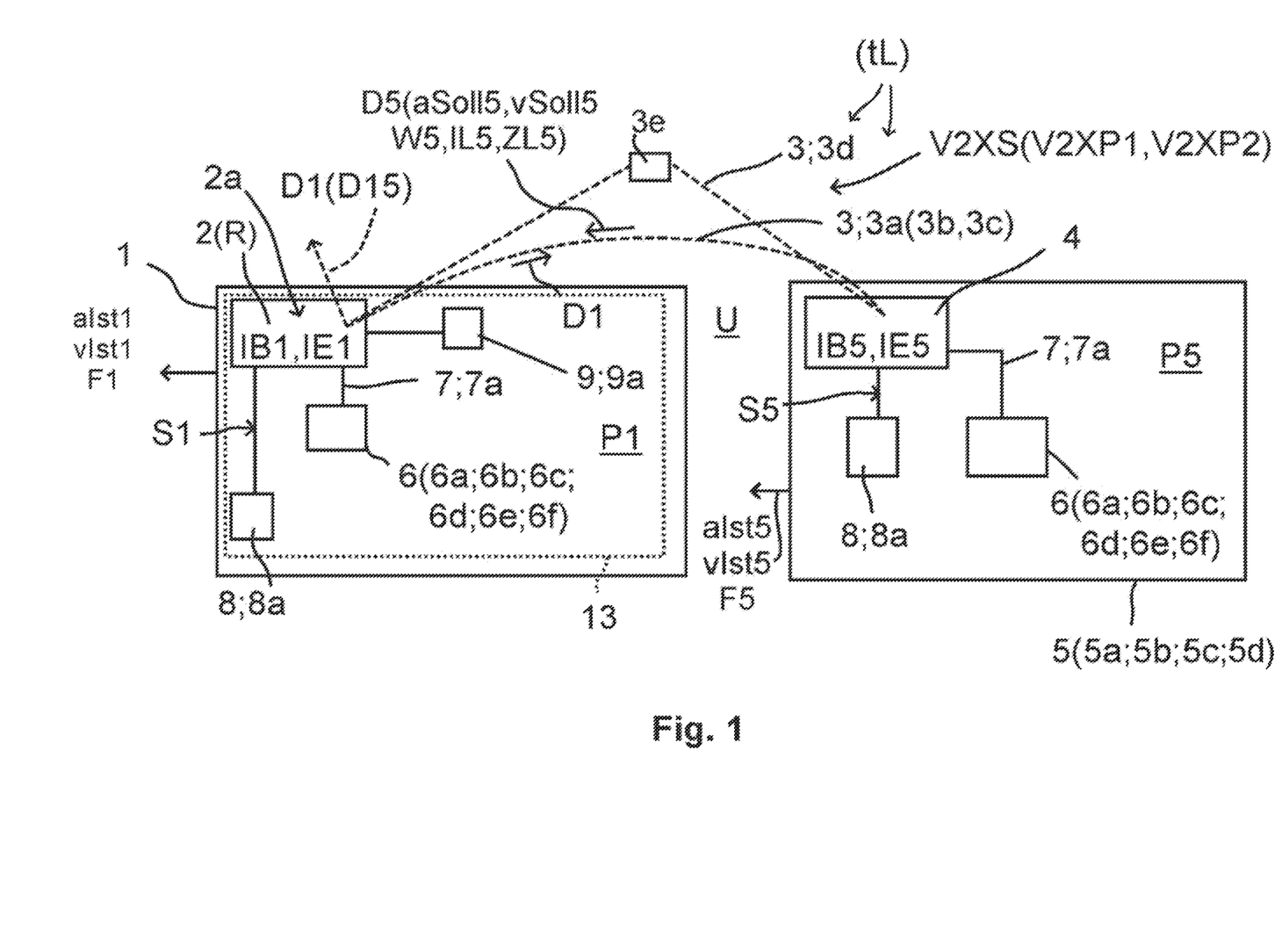
FIG. 1 is a schematic view of a trailer in a vehicle environment.

FIG. 1 depicts a trailer 1, which is located in a vehicle environment U. The trailer 1 has a trailer communication module 2 which is configured to establish a low-latency wireless V2X data connection 3 to a subscriber communication module 4 in the vehicle environment U. The subscriber communication module 4 is situated in a road user 5 in the vehicle environment U, for example in a towing vehicle 5a associated with the trailer 1, in an infrastructure facility 5b, or in a third-party vehicle 5c that is not associated with the trailer 1. Furthermore, a subscriber communication module 4 may be situated in an additional trailer 5d associated with the trailer 1, for example if a "Roadtrain," "Megaliner," "EuroCombi" is present.

The wireless V2X data connection 3 can preferably be a direct data connection 3a which is established directly between the trailer 1 and the respective road user 5, for example a short-range DSRC (dedicated short-range communication) data connection 3b or a 5G direct connection 3c via the 5G cellular standard. Such direct data links 3a are used, for example, for standardized V2X (vehicle-to-everything) communication between two vehicles (V2V) or between a vehicle and an infrastructure facility (V2I), for example in the context of a coordinated journey in a platoon. For example, ETSI (C-) ITS ((cooperative) intelligent transport system) and/or DSRC WAVE or other known and standardized methods may be used as the DSRC data connection 3b. In this DSRC data connection 3b and also the 5G direct connection 3c, a frequency band of preferably 5.9 GHz, in particular 5.850 to 5.925 GHz, may be used. These have a connection range R of up to 1000 m.

The wireless V2X data connections 3 can preferably use a V2X standard V2XS to transmit information or messages wirelessly. According to this V2X standard V2XS, in a V2X primary data package V2XP1, for example a global position P1, P5, an actual speed vlst1, vlst5, a direction of travel F1, F5, an actual acceleration alst1, alst5, et cetera, are transmitted at regular intervals. In a V2X secondary data package V2XP2, further freely selectable information may be transmitted, for example a target acceleration aSoll1, aSoll5, load information IL1, IL5, et cetera.

Alternatively or in addition, a 5G mobile connection 3d via the 5G mobile communications standard is also possible via an additional distribution station 3e. The distributor station 3e serves only to extend the range, that is, no intelligent processing of the data D1, D5 takes place in the distributor station 3e. Accordingly, the data D1, D5 are essentially merely forwarded without an active request being received, that is, the forwarding occurs without being requested. Accordingly, no direct connection is formed between the road users 5. Here, too, however, a V2X standard V2XS can preferably be used for the transmission of information or messages.

Due to the use of the respective V2X data connection 3; 3a: 3d according to the V2X standard V2XS, a low latency tL of less than 200 ms, preferably less than 100 ms, in particular less than 50 ms, may be achieved, so that the data exchange D1, D5 takes place very quickly.

The trailer communication module 2, like the subscriber communication module 4, is configured to transmit trailer data D1 and receive subscriber data D5 via the wireless V2X data connection 3, preferably according to the V2X standard V2XS. The respective data D1, D5 may include far example trailer movement information IB1 or subscriber movement information IB5 of the respective road user 5. For example, a global position P1, P5, a direction of travel F1, F5, an actual acceleration alst1, alst5, a target acceleration aSoll1 aSoll5, an actual velocity vlst1, vlst5, a target velocity vSoll1, vSoll5, et cetera, of the trailer 1 or the respective road user 5 may be considered as movement information IB1, IB5, wherein these are transmitted via the respective V2X data packet V2XP1, V2XP2. The indices "1" and "5"

refer to the trailer 1 and the respective road user 5, respectively, wherein the movement information IB5 of the respective road user 5 is transmitted only if it applies to the respective road user 5.

The movement information IB1, IB5 may be determined by a corresponding sensor system 6, for example a GNSS (global navigation satellite system) sensor 6a, in particular GPS (global positioning system), and/or wheel speed sensors 6b on the wheels and/or acceleration sensors 6c that can measure an actual acceleration aIst1, aIst5 in an x-direction and/or y-direction and/or z-direction, and thus in particular also a tilting of the trailer 1, and/or speed sensors 6d, et cetera, in the trailer 1 or on the respective road user 5, wherein the sensor system 6 is directly or indirectly connected to the respective communication module 2, 4 in a signal-conducting manner or is contained therein.

From the global positions P1, P5 alone, a variety of movement information IB1, IB5 may already be derived, for example the actual velocity vIst1, vIst5 or the actual acceleration aIst1, aIst5 or the direction of travel F1, F5. The movement information IB1, IB5 may also be transmitted in the trailer 1, in the towing vehicle 5a, in the additional trailer 5d, and in the third-party vehicle 5c, for example via a bus system 7 such as a CAN bus 7a, so that the existing sensor system 6 in the trailer 1 or in the respective road user 5 may be used.

Furthermore, the respective data D1, D5 may also include additional information IE1, IE5, for example a trailer danger warning W1, a subscriber danger warning W5, a piece of trailer load information IL1, a piece of subscriber load information IL5, a trailer load state ZL1, a subscriber load state ZL5, or environment signals S1, S5 of an environment detection system 8, for example an environment camera 8a, a radar sensor 8b, a LIDAR sensor 8c, an ultrasonic sensor 8d, et cetera, included on the trailer 1 and/or on the respective road user 5, if available. These may be transmitted for example via the V2X secondary data package V2XP2.

The load information IL1, IL5 may include information about the load, for example animals, cold gases, hazardous substances, an empty run, et cetera. These may be provided manually by the driver or in an automated manner. The load state ZL1, ZL5 indicates a state of the load, for example a temperature or an arrangement of the load, that is, whether for example it has tipped over, leaked, et cetera. This can be detected for example via a temperature sensor 6e in the cargo space or a cargo space camera 6f, et cetera, acting as an additional sensor system 6 in the trailer 1 or in the corresponding road user 5. A danger warning W1, W5 may for example include movement-critical driving situations of the trailer 1 or the respective road user 5 that affect the driving dynamics, for example sharp (emergency) braking or imminent overturning, or critical conditions of the load, for example a leaking liquid, et cetera.

The trailer communication module 2 is accordingly able to receive trailer movement information IB1 as well as trailer additional information IE1, to process it independently, and to transmit it accordingly via the wireless V2X data connection 3 as trailer data D1 according to the V2X standard V2XS, and thus to provide it in the vehicle environment U, The other road users 5 in the vehicle environment U, that is, either all road users 5 or a defined group of participants, may receive these trailer data D1 via their subscriber communication modules 4, and evaluate and respond to the data accordingly. In an identical manner, the trailer communication module 2 may also evaluate and respond to subscriber data D5 received according to the V2X standard V2XS.

The trailer 1 itself is not dependent on being coupled to a towing vehicle 5a. The trailer communication module 2 thus operates quasi autonomously and can communicate independently of the towing vehicle 5a with the respective road users 5 in the vehicle environment U, that is, it transmits its trailer data D1 according to the V2X standard V2XS not only to the towing vehicle 5a and via the vehicle to the other road users 5. This makes the trailer communication module 2 independent and intelligent, as it can act and/or react autonomously. For this purpose, the trailer communication module 2 may be operated in different operating modes BM, in which it does not necessarily react only to external requirements; but can also act independently of them. Moreover, this also applies to any additional trailer 5d of which the subscriber communication module 4 may have equivalent intelligence or be identical to the trailer communication module 2.

The V2X wireless data connection 3, in particular the short-range direct data connection 3a (DSRC 3b, 5G direct 3c), may thus be referred to as a type of T2X (trailer-to-everything) data connection, T2T (trailer-to-trailer), T2V (trailer-to-vehicle). T2I (trailer-to-infrastructure), which enables an independent and intelligent data exchange in a standardized form or according to the V2X standard V2XS. Above all, this has the advantage that the wireless V2X data connection 3 also functions if the assigned towing vehicle 5a is not equipped with corresponding technology for wireless data transmission or if the towing vehicle 5a is not currently coupled. This makes the solution vendor-independent and flexible.

The trailer communication module 2 is powered by an energy source 9 that is independent of the towing vehicle 5a, for example a battery 9a that is arranged in the trailer 1 and that can supply energy even without a coupled towing vehicle 5a. However, the energy source 9 can be charged via a coupled towing vehicle 5a, or via solar panels on the roof, or via recuperation units on the trailer 1, or other known charging methods.

Thus, the trailer 1 (and, if applicable, each additional trailer 5d) can communicate according to the V2X standard V2XS as an autonomous "vehicle" in the wireless network that is formed by the respective wireless V2X data connection 3, and is not dependent on a towing vehicle 5a that acts as an energy source or as a computing unit or as a master. Thus, a new open and standardized interface from the trailer 1 (and possibly also from each additional trailer 5d) to the outside is created in order to be able to act and react independently.

Figure 3:
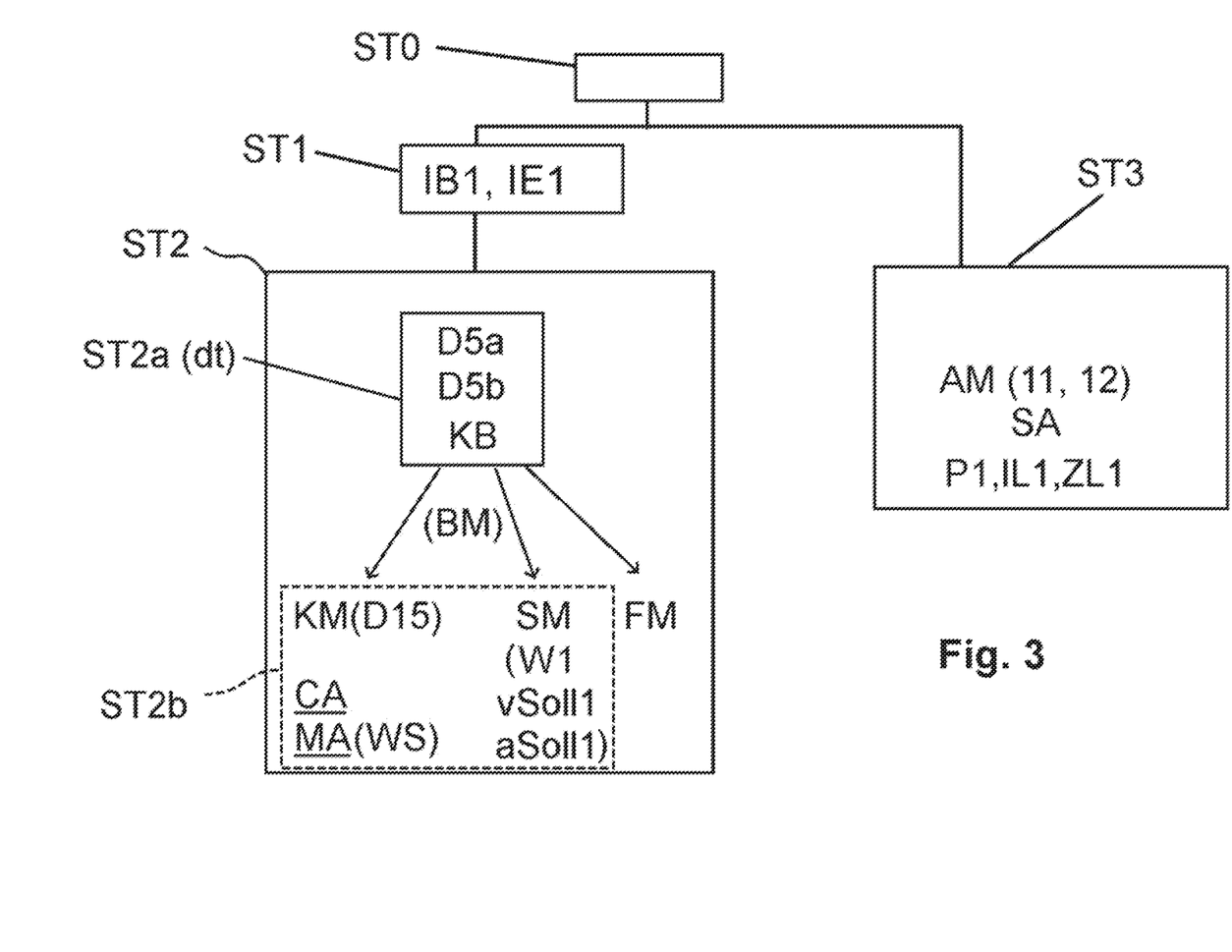
FIG. 3 is a flowchart of the method according to the present disclosure.

Thus, in a method according to FIG. 3, after an initial initialization step ST0, the trailer movement information IB1 and/or the trailer additional information IE1 described above may first be read into the trailer communication module 2 or generated and selected therein (ST1). The trailer movement information IB1 and/or the trailer additional information IE1 are generated primarily in the trailer 1, that is, independently of the presence of a towing vehicle 5a or another road user 5.

Subsequently, this selected trailer movement information IB1 and/or the selected trailer additional information IE1 may be transmitted in a second step ST2 via the wireless V2X data connection 3 as trailer data D1 according to the V2X standard V2XS in the respective V2X data packets V2XP1, V2XP2. The wireless transmission of the trailer data D1 or even the selection of the trailer data D1 to be output is initiated as a function of an autonomously set operating mode BM. The trailer communication module 2 therefore determines, autonomously and without a request from the respective road user 5 that receives the trailer data D1, which trailer data D1 is actually transmitted.

The trailer communication module 2 thus has an intelligence or algorithm 2*a* that enables it to select and activate an operating mode BM autonomously and to output selected trailer data D1 as a function thereof. Simultaneously, the trailer communication module 2 may also receive and autonomously process subscriber data D5 via the wireless V2X data connection 3 (ST3), as a function of an autonomously selected and activated operating mode BM.

The operation of the trailer communication module 2 is completely independent of the presence of a towing vehicle 5*a*, for example when the trailer 1 is parked in a depot, and also independent of the wireless V2X data connection 3 used by the towing vehicle 5*a* or the subscriber communication module 4 used therein, if these exist therein at all. The trailer communication module 2 is thus self-sufficient and intelligent, as it can act and react autonomously. This makes it possible that towing vehicles 5*a* and/or additional trailers 5*d* that are associated with the trailer 1 and do not have such a subscriber communication module 4 benefit from the intelligence of the trailer 1 and/or the trailer communication module 2, since, after coupling the trailer 1 to such a towing vehicle 5*a* or such an additional trailer 5*d*, the entire vehicle has such an intelligent unit, the trailer communication module 2.

Figure 2:
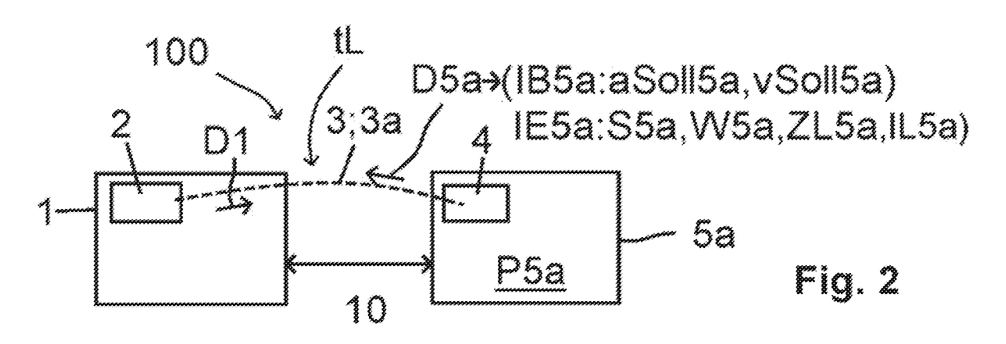
FIG. 2 is a schematic view of a vehicle combination.

The intelligent trailer communication module 2 is configured for example to independently adjust the trailer data D1 to be transmitted if a coupled towing vehicle 5*a* and/or additional trailer 5*d* is present in which a subscriber communication module 4 is arranged that transmits corresponding towing vehicle data D5*a* and/or additional-trailer data D5*d* (see FIG. 2).

Normally, a towing vehicle 5*a* or an additional trailer 5*d* transmits towing vehicle data D5*a* or additional-trailer data D5*d* according to the V2X standard V2XS via a wireless V2X data connection 3 used here, in particular a direct data connection 3*a*, which also at least partially relate to the entire vehicle combination 100 comprising the towing vehicle 5*a* and the at least one coupled trailer 1 or additional trailer 5*d*. This follows from the fact that a differentiation between the towing vehicle 5*a* and the coupled trailer(s) 1, 5*d* is often not possible, for example for the actual acceleration or the actual speed of the entire vehicle combination 100. Furthermore, the towing vehicle 5*a* does not always have detailed information from the trailer 1 or the additional trailer 5*d*.

Based on this, the trailer communication module 2 is able, in a recognition step ST2*a*, to plausibly detect a subscriber communication module 4 in the towing vehicle 5*a* and/or additional trailer 5*d* associated with the trailer 1, for example based on the towing vehicle data. D5*a* output by the towing vehicle 5*a* over a predetermined time period dt, or based on the additional-trailer data D5*d* output by the additional trailer 5*d* over a predetermined time period dt. The towing vehicle data D5*a* or additional-trailer data D5*d* may also contain a coupling message KB, for example in the V2X secondary data package V2XP2, which provides information on the mutual coupling and which may be used for plausibility checks.

If this active coupling is detected by the trailer communication module 2, the trailer communication module 2 is switched to a coupling mode KM (operating mode BM) in which the trailer data D1 are selected or adjusted. The trailer communication module 2 possibly no longer outputs all available information as trailer data D1 according to the V2X standard V2XS via the wireless V2X data connection 3, but only coupling data D15. Simultaneously, the towing vehicle 5*a* continues to transmit towing vehicle data D5*a*, or the additional trailer 5*d* continues to transmit additional-trailer data D5*d*.

The coupling data D15 include the trailer data D1, which were compared with the towing vehicle data D5*a* or the additional-trailer data D5*d* and checked for plausibility. The trailer communication module 2 uses the received towing vehicle data D5*a* or additional-trailer data D5*d* to decide whether, for example, the trailer actual speed vIst1 and/or the trailer actual acceleration aIst1 and/or the trailer target acceleration aSoll1 and/or the trailer target speed vSoll1 match or confirm the correspondingly transmitted towing vehicle movement information IB5*a*, or whether the respective trailer data D1 are more accurate. If this is not the case, the respective trailer movement information IB1 is not transmitted as coupling data D15, or rather, only that information for which there are no contradictions with the towing vehicle movement information IB5*a*. This applies analogously to the additional-trailer data D5*d*, which may be checked for plausibility accordingly.

Since the towing vehicle 5*a* for example does not have access to current trailer movement information IB1 and/or trailer additional information IE1 in every situation, trailer-specific information for which there is no contradiction with the towing-vehicle-specific information may be transmitted in addition in the coupling data D15. Thus, an actual overall picture of the current driving situation of the vehicle combination 100 may be derived from the coupling data D15 together with the towing vehicle data D5*a* and/or the additional-trailer data D5*d*.

If a towing vehicle 5*a* and/or an additional vehicle 5*d* has a subscriber communication module 4, this is communicated to the trailer communication module 2, as described, via a plausibility check of the towing vehicle data D5*a* or the additional-trailer data D5*d* over the time period dt, or via the coupling message KB contained in the towing vehicle data D5*a* and/or the additional-trailer data D5*d* (see detection step ST2*a*). As a result, the intelligent trailer communication module 2 may additionally be operated in an interface mode SM (operating mode BM), in which the normally existing CAN interface 10 between the trailer 1 and the towing vehicle 5*a* associated with it or the additional trailer 5*d* associated with it is extended.

The CAN interface 10 is normally standardized, so that the exchange of information via the interface is limited and an extension is not possible. However, in the interface mode SM, the wireless V2X data connection 3 between the trailer 1 and the towing vehicle 5*a* or the additional trailer 5*d* may be used in parallel with the CAN interface 10, in order to exchange data D1, D5*a*, D5*d* that otherwise cannot be exchanged via the CAN interface 10. This parallel path is also low-latency and standardized, according to the V2X standard V2XS, wherein in this case, however, additional information may also be transmitted via the V2X data packets V2XP1, V2XP2. In contrast to the CAN interface 10, the V2X interface is expandable. Based on the transmitted data D1, D5*a*, D5*d*, the trader communication module 2 can then act autonomously.

The exchanged data D1, D5*a*, D5*d*, which otherwise cannot be transmitted via the CAN interface 10, may for example be the trailer additional information IE1 as well as the towing vehicle additional information IE5*a*, that is, for example a trailer danger warning W1, a towing vehicle danger warning W5*a*, a piece of trailer load information IL1, a piece of towing vehicle load information IL5*a*, a trailer load state ZL1, a towing vehicle load state ZL5*a*, or environment signals S1, S5a of an environment detection system 8, for example a camera 8a, on the at least one trailer 1, 5d and/or on the at least one towing vehicle 5a. Analogous information may also be provided by the additional trailer 5d.

Via the wireless V2X data connection 3, exchanged data D1, D5a, D5d as well as the movement information IB1, IB5a may be used, in particular also a towing vehicle target acceleration aSoll5a or a towing vehicle target speed vSoll5a, from which it is possible to infer, autonomously, (emergency) braking of the towing vehicle 5a in the trailer 1 via the trailer communication module 2, and to respond to it correspondingly. If this is determined, the trailer communication module 2 may autonomously initiate braking of the trailer 1 even before a pneumatic control pressure from the towing vehicle 5a acts pneumatically in the trailer 1 via the coupling head (yellow). This allows braking of the trailer 1 to occur more quickly, so that pushing of the trailer 1 onto the towing vehicle 5a may be avoided in such braking situations. This applies analogously to any additional trailer 5d that can be operated with such an intelligent trailer communication module 2 in an interface mode SM.

Furthermore, a checking step ST2b may be provided, in which, in particular in interface mode SM, the trailer communication module 2 and/or the subscriber communication module 4 checks whether the CAN interface 10 between the at least one towing vehicle 5a and the trailer 1 and/or the at least one additional trailer 5d and the trailer 1 has failed. If a CAN failure CA of the CAN interface is detected, those trailer data D1 and/or towing vehicle data D5a and/or additional-trailer data D5d that are transmitted via the CAN interface 10 without a CAN failure CA are also transmitted via the wireless V2X data connection 3. It is thus possible to provide redundant data transmission, which is monitored by the trailer communication module 2 and/or the subscriber communication module 4.

In the checking step ST2b, following the activation of the interface mode SM and/or the coupling mode KM, the trailer communication module 2 may also check continuously or at intervals whether the subscriber communication module 4 in the towing vehicle 5a and/or in the additional trailer 5d has failed. If a module failure MA of the respective subscriber communication module 4 is detected, the trailer communication module 2 may output a failure warning signal WS via the wireless V2X data connection 3 and/or select the output trailer data D1 in such a way that towing vehicle data D5a and/or additional-trailer data D5d lost due to the module failure MA are replaced. This also makes it possible to provide redundancy while maintaining information density.

If it is plausibly detected by the trailer communication module 2 in the detection step ST2a that the trailer 1 is not coupled to any towing vehicle 5a and/or additional trailer 5d, or if it cannot be plausibly determined that the trailer 1 is coupled to a towing vehicle 5a and/or additional trailer 5d, the trailer communication module 2 is switched to a free mode FM (operating mode BM), In this mode, the trailer communication module 2 can transmit trailer data D1 autonomously and/or receive subscriber data D5.

In addition, the trailer communication module 2 may be operated in a query mode AM (operating mode BM) in all operating modes BM, wherein this is done based on the subscriber data D5 obtained in the third step ST3. In this query mode AM, query signals SA may also be processed from the subscriber data D5 transmitted via the wireless V2X data connection 3. The query signals SA may be transmitted via a service announcement (standardized) or proprietarily by external road users 5, for example at a roadside 11 or at depots 12. With the aid of these query signals SA, the respective road users 5 may for example query the global trailer position P1 or the trailer load information IL1 or the trailer load state ZL1, whereupon the trailer communication module 2 in the trailer 1 can respond autonomously and in an automated manner, or upon enabling by the driver, provided that the respective query signal SA is trusted.

Likewise, the trailer communication module 2 may query subscriber movement information IB5 and/or subscriber additional information IE5 from other traffic participants 5, for example from the towing vehicle 5a, via a query signal SA, and process this subscriber data D5 itself and/or continuously broadcast it via the wireless V2X data connection 3, and thus possibly also act as a node.

In order to optimize integration into the trailer 1, the trailer communication module 2 may be coupled to the electronic trailer braking system 13 (TEBS, electronic braking system for trailers), for example via the CAN bus 7a. In principle, however, a stand-alone solution is also conceivable, for example for trailers 1 without TEBS.

Preferably, it may further be provided that the data D1, D15, D5, D5a, D5d that are directed to a particular road user 5 or the trailer 1 are transmitted signed and/or encrypted via the wireless V2X data connection 3 in order to increase data security. The respective communication modules 2, 4 are accordingly also configured to encrypt and decrypt the data D1, D15, D5, D5a, D5d.

Furthermore, detected and/or received data D1, D15, D5, D5a, D5d may be stored in the trailer communication module 2 and transmitted only when a previously registered road user 5 is within a connection range R of the wireless direct connection 3a. On the other hand, the stored data D1, D15, D5, D5a, D5d may also be transmitted or requested at a specific time t.

It is understood that the foregoing description is that of the preferred embodiments of the invention and that various changes and modifications may be made thereto without departing from the spirit and scope of the invention as defined in the appended claims.

LIST OF REFERENCE CHARACTERS (PART OF THE DESCRIPTION)

1 Trailer
2 Trailer communication module
2a Algorithm
3 Wireless V2X data connection
3a Direct data connection
3b DSRC data connection
3c 5G direct connection
3d 5G mobile connection
3e Distribution station
4 Subscriber communication module
5 Road user
5a Towing vehicle
5b Infrastructure facility
5c Third-party vehicle
5d Additional trailer
6 Sensor system
6a GNSS sensor
6b Wheel speed sensor
6c Acceleration sensor
6d Speed sensor
6e Temperature sensor
6f Cargo space camera
7 Bus system 7a CAN bus
8 Environment detection system
8a Environment camera
8b Radar sensor 8b
8c LIDAR sensor
8d Ultrasonic sensor
9 Energy source
9a Battery
10 CAN interface
11 Roadside
12 Depot
13 Electronic trailer braking system (TEBS)
100 Vehicle combination
alst1 Trailer actual acceleration
alst5 Subscriber actual acceleration
AM Query mode
BM Operating mode
aSoll1 Trailer target acceleration
aSoll5 Subscriber target acceleration
aSoll5a Towing vehicle target acceleration.
CA CAN failure
D1 Trailer data
D15 Coupling data
D5 Subscriber data
D5a Towing vehicle data
D5d Additional-trailer data
dt Time period
F1 Trailer direction of travel
F5 Subscriber direction of travel
IB1 Trailer movement information
IB5 Subscriber movement information
IB5a Towing vehicle movement information
IE1 Trailer additional information
IE5 Subscriber additional information
IE5a Towing vehicle additional information
IL1 Trailer load information
IL5 Subscriber load information
IL5a Towing vehicle load information
KM Coupling mode
KB Coupling message
MA Module failure
P1 Global trailer position
P5 Global subscriber position
P5a Global towing vehicle position
R Connection range
S1 Trailer environment signal
S5 Subscriber environment signal
S5a Towing vehicle environment signal
SA Query signal
SM Interface mode
t Time
tL Latency time
U Vehicle environment
V2XS V2X standard
V2XP1 V2X primary data packet
V2XP2 V2X secondary data packet
vlst1 Trailer actual speed
vlst5 Subscriber actual speed
vSoll1 Trailer target speed
vSoll5 Subscriber target speed
vSoll5a Towing vehicle target speed
W1 Trailer danger warning.
W5 Subscriber danger warning
W5a Towing vehicle danger warning
WS Failure warning signal
ZL1 Trailer load state
ZL5 Subscriber load state
ZL5a Towing vehicle load state

What is claimed is:

1. A method for transmitting data (D1, D5) between a trailer and a road user in a vehicle environment (U), the method comprising the steps of:
   transmitting the data (D1, D5) according to a V2X standard (V2XS) with a low latency via a wireless V2X data connection between a trailer communication module of the trailer and a subscriber communication module of the road user;
   establishing the wireless V2X data connection according to one of the following:
   i) directly between the trailer communication module and the corresponding subscriber communication module; or,
   ii) indirectly via a distribution station wherein the distribution forwards the transmitted data (D1, D5) directly;
   via said trailer communication module, autonomously selecting and activating an operating mode (BM) in dependence upon the corresponding road user; and,
   at least one of the following steps applying as a function of the activated operating mode (BM):
   i) selecting and autonomously transmitting trailer data (D1) relating to the trailer according to the V2X standard (V2XS) via the wireless V2X data connection; and,
   ii) receiving and autonomously processing subscriber data (D5) provided by road users and relating to the road users in accordance with the V2X standard (V2XS);
   wherein at least one of:
   the trailer communication module is operated in a coupling mode (KM) if the trailer communication module plausibly determines that the trailer is coupled to at least one towing vehicle associated with the trailer; and,
   the trailer communication module determines that at least one additional trailer associated with the trailer is coupled, wherein, in the coupling mode (KM), the trailer communication module autonomously does at least one of the following:
   i) selects; and,
   ii) adjusts
   the trailer data (D1) and outputs the data to the vehicle environment (U) for reception by other road users; and,
   wherein trailer data (D1) to be outputted for this purpose:
   i) are compared with towing vehicle data (D5a);
   ii) are compared with additional-trailer data D5d); and,
   iii) are checked for plausibility and contradictory trailer data (D1) are not transmitted.

2. The method of claim 1, wherein a direct data connection, which is established directly between the trailer and one of the road users, is used as a wireless V2X data connection; and, wherein at least one of the following applies:
   i) the direct data connection is a short-range DSRC data connection or a 5G direct connection; and,
   ii) the direct data connection is a 5G mobile connection that is established indirectly between the trailer and one of the road users via a distribution station.

3. The method of claim 2, wherein the direct data connection lies in a frequency band between 5.850 and 5.925 GHz and has a connection range (R) of up to 1000 m.

4. The method of claim 1, wherein a V2X data connection is established with a latency (tL) of less than one of the following: 200 ms, less than 100 ms, and less than 50 ms.

5. The method of claim 1, wherein the trailer data (D1) and the subscriber data (D5) are transmitted via wireless data transmission according to the V2X standard (V2X), in respectively associated V2X data packets (V2XP1, V2XP2).

6. The method of claim 1, wherein at least one of the following applies:
   i) the autonomously transmitted trailer data (D1) are selected as a function of the road user receiving the trailer data (D1); and,
   ii) the autonomously transmitted trailer data (D1) are selected independently of external software.

7. The method of claim 1, wherein the trailer communication module autonomously re-outputs the subscriber data (D5) received from road users and relating to the road users via the wireless V2X data connection.

8. The method of claim 1, wherein the trailer communication module is operated in a free mode (FM) when the trailer communication module corresponds to at least one of the following:
   i) plausibly determining that the trailer is not coupled to any towing vehicle;
   ii) plausibly determining that the trailer is not coupled to any additional trailer; and,
   iii) cannot plausibly determine whether the trailer is coupled to at least one of the following: towing vehicle and an additional trailer.

9. The method of claim 1, wherein the trailer communication module is configured to activate at least one of the coupling mode (KM) and an interface mode (SM) if, based on at least one of the towing vehicle data (D5a) output by the towing vehicle via the wireless V2X data connection, the additional-trailer data (D5d) output by the additional trailer via the wireless V2X data connection, and a coupling message (KB), it is plausibly determined that the trailer is coupled to at least one of the at least one towing vehicle and to the at least one additional trailer.

10. The method of claim 1, wherein, in an interface mode (SM), at least one of the following are exchanged via the wireless V2X data connection:
    i) the trailer data;
    ii) the towing vehicle data (D5a); and,
    iii) the additional-trailer data (D5d);
    between at least one of the following:
    iv) the trailer and the at least one towing vehicle; and,
    v) the trailer and the at least one additional trailer.

11. The method of claim 10, wherein, in the interface mode (SM), at least one of the following:
    i) only those trailer data (D1);
    ii) towing vehicle data; and,
    iii) additional-trailer data;
    are transmitted via the wireless V2X data connection which cannot be transmitted via a standardized CAN interface in accordance with at least one of the following:
    iv) between at least one towing vehicle and the trailer;
    v) between the at least one additional trailer and the trailer including at least one of a towing vehicle target acceleration and a towing vehicle target speed.

12. The method of claim 10, wherein at least one of the trailer communication module and the subscriber communication module determine, in the interface mode (SM), whether a CAN interface with respect to at least one of the following:
    i) between the at least one towing vehicle and the trailer; and,
    ii) between the at least one additional trailer and the trailer;
    has failed; and,
    wherein, in the event of a CAN failure (CA) of the CAN interface, those trailer data (D1) and/or towing vehicle data (D5a) and/or additional-trailer data (D5d) that are transmitted via the CAN interface without the CAN failure (CA) are also transmitted via the wireless V2X data connection.

13. The method of claim 9, wherein, following the activation of the interface mode (SM) and/or the coupling mode (KM), the trailer communication module checks whether the subscriber communication module in the towing vehicle and/or in the additional trailer has failed; and, wherein, in the event of a module failure (MA) of the corresponding subscriber communication module, the trailer communication module outputs a failure warning signal (WS) via the wireless V2X data connection and/or selects the output trailer data (D1) in such a way that the towing vehicle data (D5a) and/or the additional-trailer data (D5d) lost due to the module failure (MA) are replaced.

14. The method of claim 1, wherein the trailer communication module is operated in a query mode (AM), wherein the trailer communication module processes query signals (SA) in the query mode (AM), wherein the query signals (SA) are contained in the received subscriber data (D5) from the respective road users, and the trailer communication module selects and transmits trailer data (D1) as a function of the query signals (SA).

15. The method of claim 14, wherein the trailer communication module selects and transmits trailer data (D1) only if the road user transmitting the query signal (SA) is trusted.

16. The method of claim 1, wherein:
    trailer movement information (IB1) and/or trailer additional information (IE1) determined in the trailer are transmitted in the trailer data (D1), wherein:
    the trailer movement information (IB1) includes a global trailer position (P1) and/or a trailer direction of travel (F1) and/or a trailer actual acceleration (aIst1) and/or a trailer target acceleration (aSoll1) and/or a trailer actual speed (vIst1) and/or a trailer target speed (vSoll1); and,
    the trailer additional information (IE1) contains a trailer danger warning (W1) and/or a piece of trailer load information (IL1) and/or a trailer load state (ZL1) and/or trailer environment signals (S1).

17. The method of claim 1, wherein:
    subscriber movement information (IB5) and/or subscriber additional information (IE5) are transmitted in the subscriber data (D5);
    the subscriber movement information (IB5) includes a global subscriber position (P5) and/or a subscriber direction of travel (F5) and/or a subscriber actual acceleration (aIst5) and/or a subscriber target acceleration (aSoll5) and/or a subscriber actual velocity (vIst5) and/or a subscriber target velocity (vSoll5); and,
    the subscriber additional information (IE5) includes a subscriber danger warning (W5) and/or a piece of subscriber load information (IL5) and/or a subscriber load state (ZL5) and/or subscriber environment signals (S5).

18. The method of claim 16, wherein the movement information (IB1, IB5) is determined by a sensor system; and, the movement information (IB1, IB5) is transmitted from the sensor system to the trailer communication module via a bus system or the sensor system is arranged at least partially in the trailer communication module.

19. The method of claim 16, wherein the load state (ZL1, ZL5) is detected via a temperature sensor and/or a cargo space camera in the trailer or in the road user.

20. The method of claim 1, wherein the trailer communication module in the trailer is supplied with energy independently of the road users.

21. The method of claim 1, wherein the trailer data (D1) and/or subscriber data (D5) are transmitted encrypted via the wireless V2X data connection.

22. The method of claim 1, wherein the trailer communication module transmits the trailer data (D1) only when a road user with a subscriber communication module is within connection range (R) of the trailer communication module.

23. A trailer communication module for enabling a transmission of data (D1) between a trailer and a road user in a vehicle environment (U), the trailer communication module comprising being configured to carry out the steps of claim 1.

24. A trailer with the trailer communication module of claim 23, wherein the trailer communication module is autonomous or is a component of an electronic trailer braking system.

25. The method of claim 18, wherein the bus system is a CAN bus.

26. The method of claim 18, wherein the sensor system is at least one of a GNSS sensor, a plurality of wheel speed sensors, a plurality of acceleration sensors, and a plurality of speed sensors on at least one of the trailer and the respective road user.

27. The method of claim 1, wherein the trailer communication module is configured to activate at least one of the coupling mode (KM) and an interface mode (SM) if, based on at least one of the towing vehicle data (D5a) output by the towing vehicle via the wireless V2X data connection based on a global towing vehicle position, the additional-trailer data (D5d) output by the additional trailer via the wireless V2X data connection, and a coupling message (KB), it is plausibly determined that the trailer is coupled to at least one of the at least one towing vehicle and to the at least one additional trailer.

* * * * *

UNITED STATES PATENT AND TRADEMARK OFFICE
CERTIFICATE OF CORRECTION

| | | |
|---|---|---|
| PATENT NO. | : 12,143,907 B2 | Page 1 of 1 |
| APPLICATION NO. | : 17/865211 | |
| DATED | : November 12, 2024 | |
| INVENTOR(S) | : Werle | |

It is certified that error appears in the above-identified patent and that said Letters Patent is hereby corrected as shown below:

On the Title Page

Page 2:
Item (56) Foreign Patent Documents:
Fourth Line: delete "10/2017" and insert -- 5/2019 --

In the Specification

In Column 1:
Line 10: delete "PCT/EP20201052122" and insert -- PCT/EP2020/052122 --

In Column 8:
Line 58: delete "far" and insert -- for --

In Column 9:
Line 60: delete "U, The" and insert -- U. The --

In Column 10:
Line 22: delete ". T2I" and insert -- , T2I --

In Column 11:
Line 52: delete "." after "data"

In Column 12:
Line 58: delete "trader" and insert -- trailer --

In Column 13:
Line 56: delete ", In" and insert -- . In --

Signed and Sealed this
Twenty-ninth Day of April, 2025

Coke Morgan Stewart
*Acting Director of the United States Patent and Trademark Office*